(12) United States Patent
Fogg

(10) Patent No.: US 7,478,548 B2
(45) Date of Patent: Jan. 20, 2009

(54) REAMING APPARATUS

(75) Inventor: James Edward Fogg, Great Yarmouth (GB)

(73) Assignee: Weatherford U.K. Limited, Norfolk (GB)

( * ) Notice: Subject to any disclaimer, the term of this patent is extended or adjusted under 35 U.S.C. 154(b) by 330 days.

(21) Appl. No.: 11/273,892

(22) Filed: Nov. 14, 2005

(65) Prior Publication Data
US 2006/0110226 A1 May 25, 2006

(30) Foreign Application Priority Data
Nov. 11, 2004 (GB) ................................. 0424885.2

(51) Int. Cl.
*B21C 37/29* (2006.01)
(52) U.S. Cl. ............................. 72/71; 72/72; 72/370.01; 72/449
(58) Field of Classification Search .................. 72/70, 72/71, 72, 125, 370.01, 370.1, 443, 449; 470/198; 82/1.4; 29/90.01; 408/125, 129, 408/133, 189, 191, 193
See application file for complete search history.

(56) References Cited
U.S. PATENT DOCUMENTS

| | | | | |
|---|---|---|---|---|
| 2,810,141 A | * | 10/1957 | Langston | ................... 408/104 |
| 2,907,234 A | * | 10/1959 | Wade et al. | ..................... 72/71 |
| 3,526,158 A | * | 9/1970 | Adams et al. | ................. 408/97 |
| 3,659,482 A | * | 5/1972 | Blake | .......................... 408/1 R |
| 4,483,222 A | | 11/1984 | Davis | |
| 4,615,243 A | * | 10/1986 | Davis | ........................... 82/1.2 |
| 4,799,409 A | * | 1/1989 | Ricci | ........................... 82/113 |
| 6,009,735 A | | 1/2000 | Knotek | |
| 6,412,376 B1 | | 7/2002 | Borgia, Jr. | |

FOREIGN PATENT DOCUMENTS

| | | | |
|---|---|---|---|
| RU | 2100122 | * | 5/1996 |
| WO | WO 01/19361 A2 | | 4/2001 |

OTHER PUBLICATIONS

Great Britain Search Report dated Feb. 18, 2005 from GB Application No. 0424885.2.
GB Search Report, GB0522950.5, dated Feb. 22, 2006.

* cited by examiner

*Primary Examiner*—Edward Tolan
(74) *Attorney, Agent, or Firm*—Patterson & Sheridan, LLP

(57) ABSTRACT

Tubing reaming apparatus comprises a housing adapted to be mounted to tubing to be reamed. The housing provides mounting for a reamer shaft adapted to mount a cutter within the tubing. The housing also provides mounting for a drive arrangement. A gear arrangement is provided between the drive arrangement and the reamer shaft. The housing may comprise a clamping arrangement adapted to reduce residual bend and ovality of the tubing.

41 Claims, 3 Drawing Sheets

REAMING APPARATUS

CROSS-REFERENCE TO RELATED APPLICATIONS

The present application is based on, and claims priority from, Great Britain Application Serial Number 0424885.2, filed Nov. 11, 2004, the disclosure of which is hereby incorporated by reference herein in its entirety.

FIELD OF THE INVENTION

This invention relates to reaming apparatus. In particular, but not exclusively, the invention relates to reaming apparatus for use in reaming tubing such as coiled tubing. Aspects of the invention also relate to methods of forming and machining tubing, particularly methods suitable for on-site use.

BACKGROUND OF THE INVENTION

In the oil and gas industry, devices are often run into wells on lengths of flexible metallic hollow tubing which may stored coiled on a spool; the tubing is thus known as coiled tubing. Individual lengths of coiled tubing, which may be hundred of metres long, are joined by means of appropriate in-line connectors that fit and seal within the ends of the lengths. Coiled tubing is normally formed from strip rolled into a cylindrical form and then welded. As noted above, the tubing is then coiled for storage and transport. Thus the tubing forming operation, and subsequent handling and coiling of the tubing, normally results in the tubing featuring a degree of ovality and residual bend. Furthermore, the internal diameter of tubing formed from strip includes an axial weld seam. Accordingly, to prepare the end of a tubing length to receive a connector, particularly a connector featuring an elastomer seal, it is normal practice to ream the tubing end using a tool such as the applicant's Internal Combination Reamer System (ICRS) unit. This is a hand operated, self-aligning unit that prepares coiled tubing to accept the applicant's Elastomer Sealed Inline Connector. The ICRS tool features a two-part sleeve, one part of the sleeve for location over the end of the tubing and being fixed to the tubing using grub screws, and the other part of the sleeve providing mounting for a shaft extending into the sleeve. A reamer or other cutter is mounted on the end of the shaft within the sleeve, while a handle for rotating the reamer is provided on the other end of the shaft. An Acme thread couples the parts of the sleeve, such that relative rotation of the parts advances the reamer into the tubing on which the sleeve is mounted. Thus, using the handle to rotate the shaft and turn the reamer while rotating the sleeve parts to feed the reamer through the tubing, a skilled operator may use the ICRS tool to ream the end of a tubing length to produce an acceptable seal bore finish on the tubing internal diameter, ready to receive a connector. However, this is a time-consuming operation. For example, reaming a 2⅞" (7.3 cm) outside diameter 0.190" (0.48 cm) wall thickness coiled tubing to a depth of 7" (17.8 cm) will typically take around four hours. Furthermore, inexperienced or unskilled operators often have difficulty in achieving the level of finish necessary to achieve a fluid-tight seal between the tubing and a connector, and furthermore will often damage the reamer: one common problem is that the reamer is advanced too quickly into the tubing and when the reamer is rotated the reamer takes too big a "bite" of the tubing wall, which leads to a poor finish and damage to the reamer. It is also difficult to ream the larger sizes of coiled tubing, due to the torque required to turn the cutter.

It is among the objectives of embodiments of the invention to provide a reaming apparatus that obviates or mitigates at least some of these difficulties.

SUMMARY OF THE INVENTION

In general, the preferred embodiments of the invention relate to apparatus and methods for use in machining operations in which a machining apparatus is mounted to and supported by a work piece. For example, the work piece may be a large spool of coiled tubing and it is of course impractical to mount such a spool on a machine tool. Also, embodiments of the invention relate to apparatus which is portable and can be moved or carried, often by one person, to an appropriate location in a work site. Thus, the apparatus may be brought to a large work piece, rather than having to move the work piece. Embodiments of the invention are also suitable for manual operation by a single operator.

In accordance with a first aspect of the present invention there is provided apparatus for reaming tubing, the apparatus comprising:

a housing providing mounting for a cutter; and a clamping arrangement adapted to locate the housing relative to tubing to be reamed, the clamping arrangement being adapted to reduce at least one of residual bend and ovality of the tubing.

The invention also relates to a method of reducing at least one of residual bend and ovality in tubing prior to a machining operation, the method comprising locating a clamping arrangement on tubing to be machined, and actuating the clamping arrangement to deform the tubing to a desired tubing form.

The method may further comprise the step of mounting tubing machining apparatus relative to the tubing via the clamping arrangement.

The reaming operation may be carried out such that the tubing may receive a tool or device, such as an in-line connector. By reducing or eliminating residual bend or ovality the clamping arrangement facilitates the subsequent reaming operation by straightening the tubing and improving the circularity of the tubing. Using a conventional clamping arrangement utilising grub screws will have little or no effect on the residual bend or ovality of the tubing, and in some cases may actually create ovality: reaming bent or oval tubing results in an uneven cutting process, as the depth of material cut from the tubing wall will vary around the circumference of the tubing. This will in turn result in the reamed wall of the tubing having a varying thickness and in some cases this may result in an unacceptable weakening of the tubing.

The clamping arrangement may comprise two or more parts defining contact surfaces for collectively defining a cylindrical form corresponding to a desired tubing form. The defined cylindrical form may be substantially continuous or may be discontinuous, for example the form may be defined by a plurality of point or line contacts. In a preferred form the clamping arrangement comprises two parts each defining a semi-cylindrical form. The parts may be configured in a loading configuration, to permit the parts to be positioned around the tubing, and in a clamping configuration, in which the contact surfaces engage the tubing surface. The clamping arrangement may further comprise retainers operable to retain the parts in the clamping configuration. Preferably the retainers are operable to apply force to the parts sufficient to deform the tubing such that the tubing is at least partially straightened or the ovality of the tubing is reduced. In a preferred embodiment the retainers comprise threaded members, such as screws, extending between the parts and which may be rotated and tightened to bring the parts together. However, other retainer configurations may also be used, including cam or clamp arrangements. The preferred retainers are manually operable, but in other embodiments the retainer may be powered, for example hydraulically or electrically actuated.

Preferably, the cylindrical form defined by the parts has an axial extent greater than the diameter of the form. Most preferably, the cylindrical form has an axial extent two or more times the form diameter.

The clamping arrangement may be integral with the housing, but most preferably is separable from the housing and includes at least one housing engaging member or profile.

Another aspect of the invention relates to a clamping arrangement adapted to reduce at least one of residual bend and ovality of a tubing for other purposes, for example to facilitate location of a tool or device on the exterior of the tubing.

According to another aspect of the present invention there is provided apparatus for reaming tubing, the apparatus comprising:
    a housing adapted to be mounted to tubing to be reamed, the housing providing mounting for (a) a reamer shaft, the shaft adapted for mounting a cutter within tubing to be reamed, and (b) a drive arrangement; and
    a gear arrangement between the drive arrangement and the reamer shaft.

The invention also relates to a method of reaming tubing, the method comprising:
    mounting a housing to tubing to be reamed such that a cutter mounted on a reamer shaft mounted to the housing is located at least partially within the tubing; and
    driving the reamer shaft to rotate the cutter via a gear arrangement.

The provision of a gear arrangement allows the nature of the input to the drive arrangement to be modified on transfer to the reamer shaft, preferably by reducing drive speed and increasing drive torque. This facilitates manual operation of the apparatus, by increasing the torque applied to the reamer shaft and thus facilitating the cutting of the tubing. Furthermore, this arrangement also facilitates adaptation of the apparatus for powered operation, for example by coupling the bit of an electric drill to the drive arrangement.

The drive arrangement may take any appropriate form, but preferably includes an operator handle adapted for rotation by an operator. In one embodiment the drive arrangement includes a crank handle. Compared to conventional reaming apparatus, the apparatus of embodiments of this aspect of the present invention may accommodate relatively high speed low torque inputs, which it is generally easier to apply manually. For example, one embodiment of the apparatus may be comfortably operated at a drive speed of 4 rpm by application of a relatively light load, compared to a typically drive speed of around 1 rpm, requiring application of significant force, for a conventional reaming apparatus. It is of course generally easier to apply a lighter load consistently, as a manually applied higher load will tend to be applied intermittently. Thus, this aspect of the invention will tend to lead to a more consistent and better quality finish on the work piece, and less load and wear to the cutter.

Preferably, the drive arrangement includes a drive shaft. Most preferably, the drive shaft is coaxial with the reamer shaft.

Preferably, the gear arrangement includes a spur gear arrangement, in which a gear wheel mounted to a drive shaft engages at least one pinion. The pinion may be a double gear and mate with a gear wheel coupled to or mounted on the reamer shaft. Of course other embodiments may feature different gear configurations and arrangements.

This aspect of the invention may further comprise a cutter advance arrangement adapted to advance the reamer shaft axially of the housing with rotation of the reamer shaft.

According to a further aspect of the present invention there is provided apparatus for reaming tubing, the apparatus comprising:
    a housing adapted to be mounted to tubing to be reamed, the housing providing mounting for a reamer shaft adapted for mounting a cutter within tubing to be reamed; and
    a cutter advance arrangement adapted to advance the reamer shaft axially of the housing with rotation of the reamer shaft.

The invention also relates to a method of reaming tubing, the method comprising:
    mounting a housing to tubing to be reamed, the housing providing mounting for a reamer shaft and a cutter;
    driving the reamer shaft to rotate the cutter; and
    advancing the cutter axially of the tubing at a rate related to the rotation of the cutter.

These aspects of the invention provide for automatic feed of the cutter with rotation of the cutter. This avoids the difficulties associated with conventional reaming apparatus in which advancement of the cutter is manually controlled independently of cutter rotation, with the result that cutter feed is likely to be intermittent and often at an inappropriate rate.

Preferably, the cutter advance arrangement is geared to the reamer shaft to provide an appropriate rate of advance. In other embodiments the cutter advance rate may be related to other parameters, for example cutter loading.

Preferably, the cutter advance arrangement includes a threaded portion for engaging a corresponding threaded portion on the housing. In one embodiment the cutter advance arrangement includes an external thread and the housing defines an internal thread.

Preferably, the housing also provides mounting for a drive arrangement and a gear arrangement between the drive arrangement and the reamer shaft. Alternatively, or in addition, the housing may include a gear arrangement between a drive arrangement and the cutter advance arrangement, which gear arrangement may include a pinion engaging a ring gear on a threaded portion of the cutter advance arrangement. In a preferred embodiment, a common or linked gear arrangement is provided between the drive arrangement and both the reamer shaft and the cutter advance arrangement. Preferably, the gear arrangement between the drive arrangement and the cutter advance arrangement is adapted to be selectively inactivated, isolated or otherwise modified to permit more rapid drive of the cutter advance arrangement. This is useful when it is desired to retract the cutter, or when there is little load on the cutter advance arrangement, and there is no requirement to provide a relatively low speed or high torque input to the cutter advance arrangement. The gear arrangement may include a gear mounting providing mounting for a pinion, which gear mounting may be selectively configured to be locked against rotation relative to the housing such that rotation of the pinion results in rotation of a ring gear engaging the pinion relative to the housing.

BRIEF DESCRIPTION OF THE DRAWINGS

These and other aspects of the present invention will now be described, by way of example, with reference to the accompanying drawings, in which.

DETAILED DESCRIPTION OF THE DRAWINGS

Figure 1:
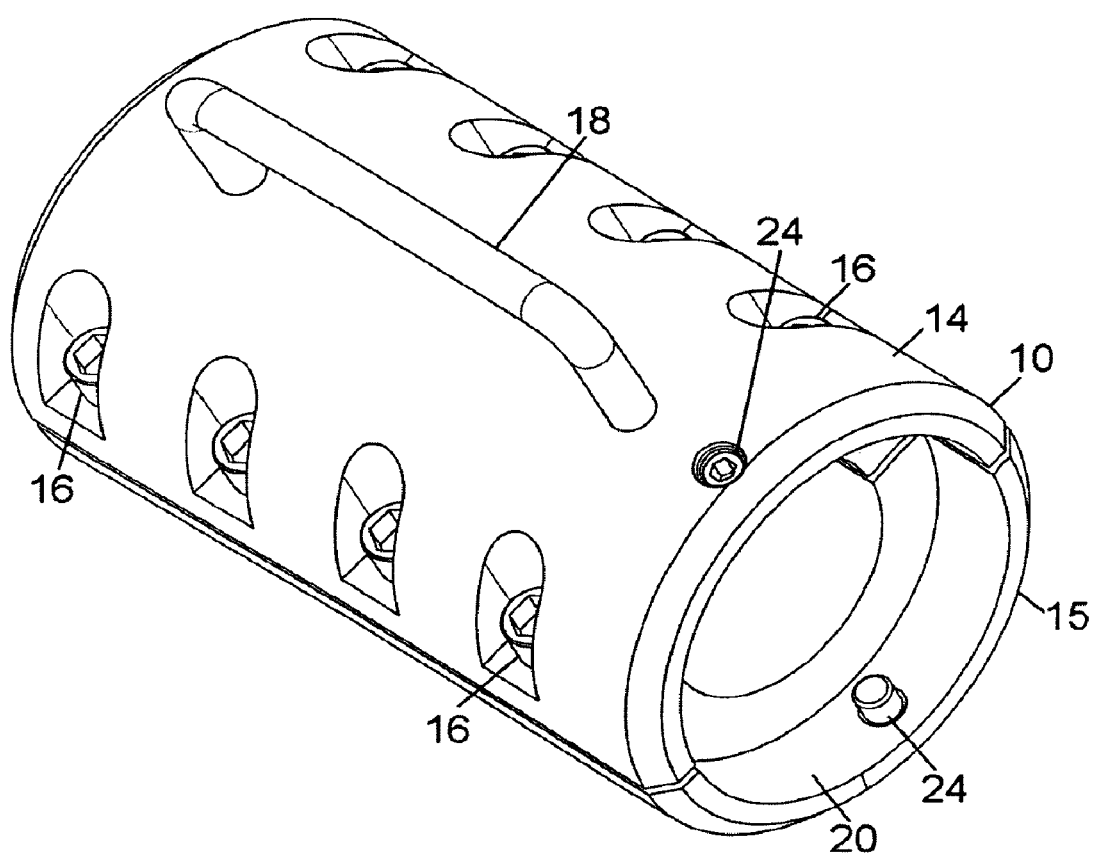
FIG. 1 is a perspective view of a clamping arrangement in accordance with an embodiment of an aspect of the present invention.
Figure 2:
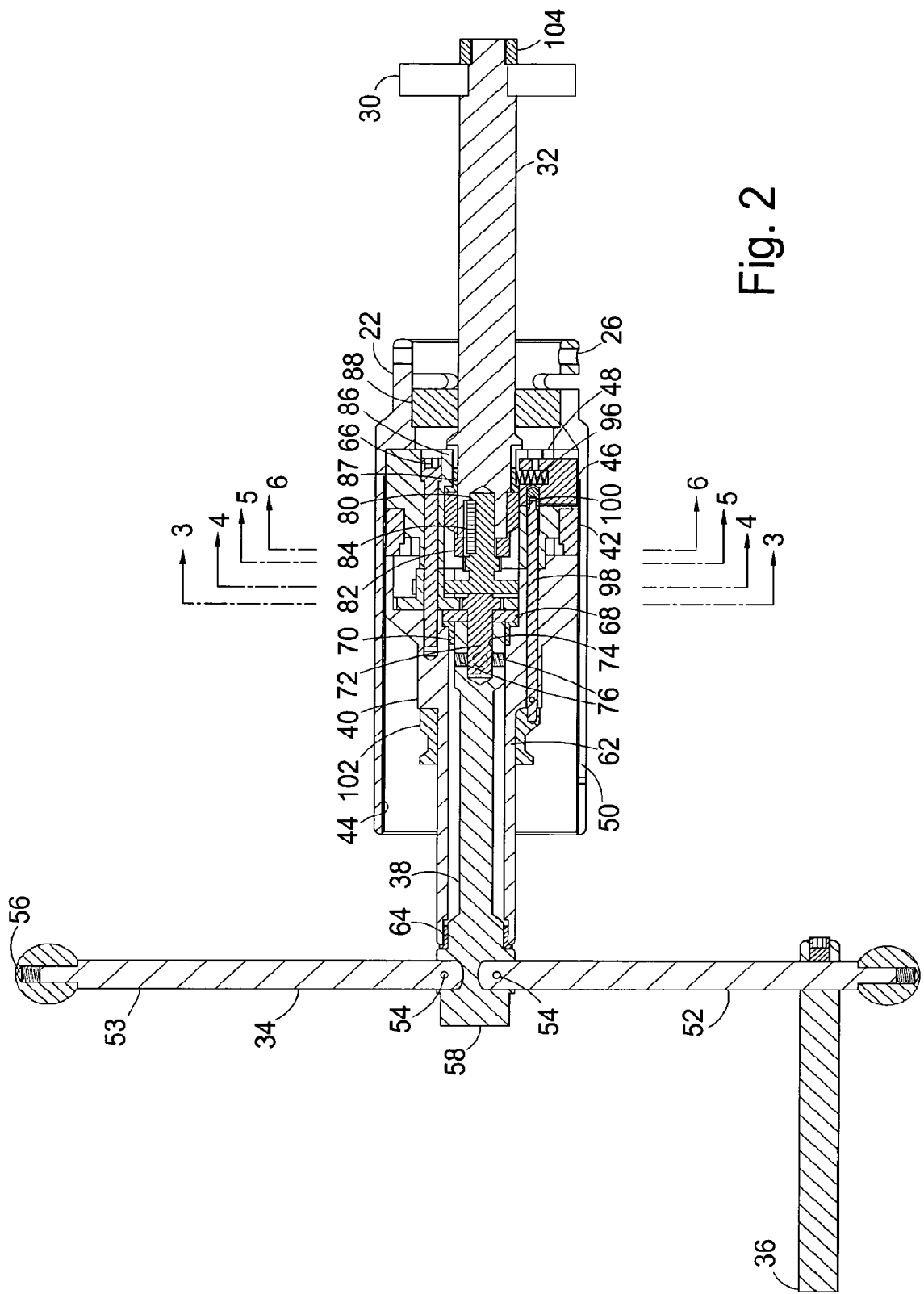
FIG. 2 is a sectional view of a reaming apparatus in accordance with an embodiment of a further aspect of the present invention.

FIG. 1 illustrates a clamp 10 to be used in conjunction with a reaming apparatus 12 as illustrated in section in FIG. 2 of the drawings. As will be described, the clamp 10 is adapted to be mounted to the end of a length of tubing, in this example 2.875" (7.3 cm) outside diameter coiled tubing, and the reamer 12 is fixed to the clamp 10 to permit a reaming operation to be carried out on the tubing.

The clamp 10 comprises two parts 14, 15 releasably secured together by eight cap head screws 16. The clamp parts 14, 15 collectively define a cylindrical inner surface defining an inside diameter of 2.875" (7.3 cm). Thus, with the screws 16 loosened, the clamp parts 14, 15 may be fitted over the end of a length of 2.875" (7.3 cm) o.d. coiled tubing. Tightening the screws 16 brings the inner surfaces of the parts 14, 15 into contact with the tubing and, if the tubing features any ovality or residual bend, continue tightening of the screws 16 will deform the tubing and force the tubing wall to conform to the internal diameter of the parts 14, 15, thus straightening the tubing and removing any ovality. Furthermore, the tight engagement of the parts 14, 15 with the tubing also provides a secure mounting for the reamer 12 on the tubing, as will be described.

From FIG. 1 it will be noted that the clamp 10 features operator handles 18 to assist an operator in manipulating the clamp 10. Furthermore, the end of the clamp 10 to be positioned at the free end of the tubing defines a socket 20 adapted to receive the reduced diameter leading end of a sleeve 22 forming the outer body of the reamer 12. Additionally, the clamp 10 features two reamer retaining screws 24 for engaging with corresponding sockets 26 formed in the end of the sleeve 22.

As noted above, in use the reamer 12 is mounted to the end of a length of coiled tubing, via the clamp 10. When the reamer 12 is mounted relative to tubing in this manner, a cutter 30 located on the free end of a reamer shaft 32 which extends from the sleeve 22 is located adjacent the end of the tubing. An operator handle 34 featuring a crank 36 is provided at the opposite end of the reamer 12. Rotation of the handle 34 by an operator turns a drive shaft 38. Rotation of the drive shaft 38 is transferred to the reamer shaft 32 via a reduction gearbox 40 located within the sleeve 22. Furthermore, the gearbox 40 carries an externally threaded ring 42 linked to the drive shaft 38 via the gearbox 40. The threaded ring 42 engages with a corresponding thread 44 provided on the inner surface of the sleeve 22 such that the rotation of the drive shaft 38 also causes the gearbox 40 to advance axially through the sleeve 22, and thus the cutter 30 to advance axially through the tubing being reamed.

During a reaming operation, rotation of the gearbox 40 relative to the sleeve 22 is prevented by engagement of a radially extending key 46 mounted in a front gearbox housing 48 with a closed end slot 50 extending axially along the lower edge of the sleeve 22. However, when the key 46 is retracted from the slot 50, as illustrated in FIG. 2, the gearbox 40 and threaded ring 42 may be rotated directly which, as will be described, facilitates retraction of the cutter 30.

The construction and operation of the reamer 12 will now be described in greater detail, with reference also being made to FIGS. 3 to 6 of the drawings, which illustrate sectional views of the gearbox 40, and to which reference will be made to described the operation of the reamer gear train.

As noted above, the reamer 12 features an operator handle 34. The handle 34 comprises two radial rods 52, 53 the inner ends of which are threaded and engage corresponding threaded sockets in the free end of the drive shaft 38, the rods 52, 53 being locked in place by respective roll pins 54. Ball knobs 56 are provided on the free ends of the rods 52, 53, and the crank handle 36 is mounted towards the outer end of one of the rods 52.

Although the reamer 12 is primarily intended for manual operation, in some circumstances it may be desired to operate the reamer 12 using a power drive, and for this purpose the end of the drive shaft 38 includes a hexagonal recess 58.

From the handle 34, the drive shaft 38 extends into a smaller diameter sleeve 62 forming part of a rear gearbox housing 60. The shaft 38 is mounted relative to the sleeve 62 by a bush 64. The rear gearbox housing 60 is secured to the front gearbox housing 48 by means of three cap head screws 66 which, as will be described, also provide mounting for pinions within the gearbox 40.

The inner end of the drive shaft 38 is retained within the housing 60 by a retainer ring 68 engaging a shoulder in the housing 60 via a bush 70. The retainer ring 68 is itself secured to the drive shaft 38 by a short input shaft 72 which extends into a blind bore 74 in the end of the shaft 38, and is retained therein by grub screws 76.

Figure 3:
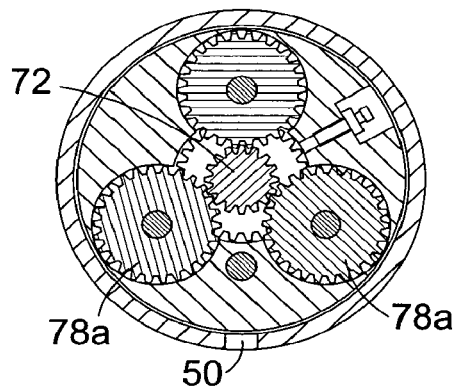
FIGS. 3, 4, 5 and 6 are sectional views on lines 3-3, 4-4, 5-5 and 6-6 of the reaming apparatus of FIG. 2.

Reference is now also made to FIG. 3, which shows the sixteen toothed end of the input shaft 72 engaging with three thirty two toothed double pinion gears 78a. The pinion gears 78 are mounted within the housing 60 on the shafts of the screws 66. With the drive shaft 38 and input shaft 72 revolving at 4 rpm clockwise, the double pinion gear 78 will revolve at 2 rpm anticlockwise.

Figure 4:
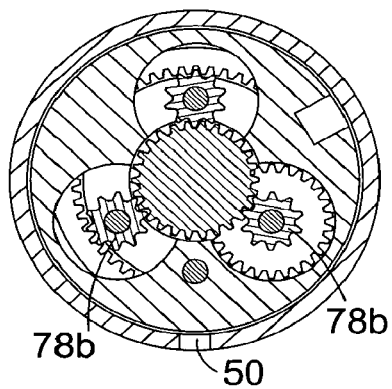

Reference is now made to FIG. 4 of the drawings, which section shows the smaller sixteen tooth part of the double pinion gears 78b mating with a thirty two tooth output shaft 80a. With the double gear 78 rotating at 2 rpm anticlockwise, the output shaft 80 rotates at 1 rpm clockwise.

If reference is made to FIG. 2, it will be noted that the output shaft 80 is coaxial with and coupled to the reamer shaft 32 via a shaft retainer 82 and key 84. The reamer shaft 32 is located relative to the front gear housing 48 by two bushes 86, 87 and also passes through an annular swarf trap 88 towards the front of the sleeve 22.

Figure 5:
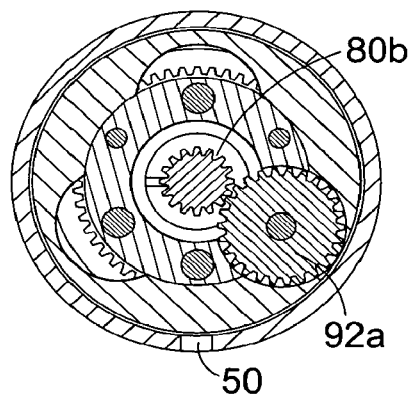
Figure 6:
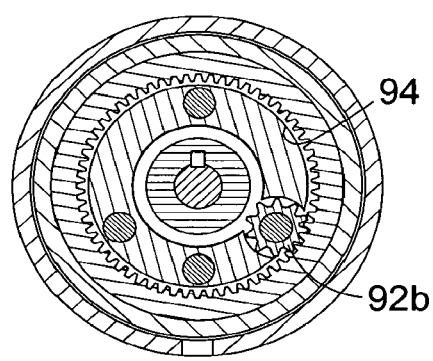

Reference is now made to FIGS. 5 and 6 of the drawings, which illustrate elements of the gearbox 40 which provide drive to the threaded ring 42 that provides for feed of the cutter 30 into the tubing to be cut. FIG. 5 shows a sixteen tooth gear 80b on the output shaft 80 which mates with a thirty two tooth double gear 92a mounted on the shaft of one of the screws 66. With the output shaft 80 revolving at 1 rpm clockwise, the double gear 92 revolves at 0.5 rpm anticlockwise.

Reference is now made to FIG. 6 which shows the sixteen tooth double gear 92b mating with a sixty six toothed ring gear 94 provided on the inner diameter of the threaded ring 42. With a double gear 92 revolving at 0.5 rpm anticlockwise, the ring gear 94 revolves at 0.121 rpm anticlockwise. This translates to a feed of 0.015" (0.04 cm) per cutter revolution using an eight tpi thread on the ring 42.

As noted above, the gear housing 48, 60 is normally held against rotation relative to the sleeve 22 by the key 46 which is urged to extend into the slot 50 by a spring 96. However, if desired, the key 46 may be retracted, out of engagement with the slot 50, by pushing the end of a key rod 98 into a recess 100 in the key 46. The key rod 98 extends through the gear housing 48, 60 from a feed ring 102 mounted on the rear gearbox housing 60, which ring 102 is pressed forward to retract the key 46 and may be pulled rearwardly by an operator to release the key 46. FIG. 2 shows the key 46 in the retracted configuration. An operator would retract the key 46 after completion of a reaming operation to allow more rapid translation of the gearbox 40 to the rear end of the sleeve 22. In particular, with the key 46 retracted, the drive shaft 38 is prevented from rotating by holding the handle 34. The gearbox 40 is then turned clockwise by the operator gripping the sleeve portion 62 to translate the gearbox 40, and thus also the cutter 30, back along the left hand Acme sleeve thread 44.

In use, the clamp 10 and reamer 12 will typically be used to prepare the end of a length of coiled tubing ready to receive an in-line connector. This involves provision of a relatively smoothed-walled recess in the end of the tubing such that the inline connector may be received and sealed within the end of the tubing.

If possible, the end of the tubing will be first located at a suitable height for working, and the tubing end supported and secured. The clamp 10 is then located over the end of the tubing, with the free end of the tubing located adjacent the base of the clamp socket 20. The clamp screws 16 are then tightened. As the semi-cylindrical clamp parts 14, 15 are brought together the clamp part surfaces will straighten any residual bend in the tubing and will also reduce or remove ovality in the tubing end.

Once the clamp 10 has been secured to the tubing, the reamer 12 may be mounted to the clamp, and secured in place by extending the screws 24 into the reamer sleeve sockets 26. At the start of a reaming operation, the gearbox 40 will be located at the rear end of the sleeve 22 to position the cutter 30 adjacent the end of the clamped tubing. The cutter 30 is located on the end of the reamer shaft 32 by a collar 104, which may be removed to allow replacement of the cutter 30 as required.

The operator then utilises the handle 18 to rotate the drive shaft 38. As noted above, rotation of the handle 18 and shaft 38 at 4 rpm is translated to rotation of the reamer shaft 32 at 1 rpm, with a corresponding increase in torque applied to the reamer shaft 32. The rotating cutter 30 provides a full diameter cut. Furthermore, with each rotation of the cutter 30 the rotation of the threaded ring 42 produces a feed of 0.015" (0.04 cm) of the gearbox 40 relative to the sleeve 22, and thus of the cutter 30 relative to the tubing.

The cutter 30 will thus be rotated and simultaneously fed through the tubing, removing the weld bead from the tubing and providing a reamed recess with a cylindrical surface with the finish necessary to form a seal bore and accept an elastomer sealed inline connector.

Once the tubing has been reamed to the appropriate depth, or if the reaming operation encounters a problem, or the gearbox 40 has reached the end of its travel within the sleeve 22, the operator retracts the anti-rotation key 46 from the sleeve slot 50 by pressing the feed ring 102. The operator then holds the handle 18 stationary while turning the sleeve 62 to retract the cutter 30 from the tubing and move the gearbox 40 back towards the rear of the sleeve 22. Accordingly, the reamer 12 may be returned to its initial configuration relatively quickly, ready for the next reaming operation.

The reamer 12 may then be dismounted from the clamp 10. A connector is inserted into the reamed coiled tubing before the clamp 10 is dismounted from the tubing, as otherwise the coiled tubing may spring back to a bent or oval form, preventing insertion of the connector.

It will be apparent to those of skill in the art that the above described clamp 10 and reamer 12 provide for effective and relatively straightforward reaming of coiled tubing to provide a seal bore, and the set-up and operation of the clamp 10 and reamer 12 is such that the operation may be completed to a high standard by relatively unskilled personnel. The provision of a reamed socket in the tubing may also be achieved relatively quickly: in testing, a length of 2⅞" (7.3 cm) outside diameter 0.190" (0.48 cm) wall coiled tubing was reamed to a depth of 7" (17.8 cm) in approximately 1.5 hours using the clamp 10 and reamer 12 as described above. This compares favourably to the 4 hours required to complete this task by a skilled operator utilising a conventional reaming tool.

Although reference has been made primarily herein to reaming of coiled tubing, those of skill in the art will recognise that aspects of the present invention may be used in a wide variety of applications for executing cutting, machining and other operations, including laser or water jet cutting, testing, inspection and surveying on work pieces of a variety of forms. Furthermore, the cutter used in the various aspects of the invention may take any appropriate form. Conventionally, coiled tubing reaming is undertaken using a fixed diameter fluted cutter, and an operator will utilise a cutter intended to ream a coiled tubing of predetermined diameter and predetermined wall thickness. However, the invention may also utilise a cutter head with a single tool bit, which bit may be adjustable to provide a variety of cutting diameters and cutting depths. This provides the apparatus with greater flexibility, but does require a degree of operator skill to correctly adjust and set the bit.

The invention claimed is:

1. Apparatus for reaming tubing, the apparatus comprising:
   a housing adapted to be mounted to tubing to be reamed, the housing providing mounting for (a) a reamer shaft, the shaft adapted to mount a cutter within tubing to be reamed, and (b) a drive arrangement;
   a gear arrangement between the drive arrangement and the reamer shaft, the gear arrangement being adapted to modify the nature of an input to the drive arrangement on transfer to the reamer shaft; and
   a cutter advance arrangement adapted to advance the reamer shaft axially relative to the housing.

2. The apparatus of claim 1, wherein the gear arrangement is adapted to reduce drive speed and increase drive torque.

3. The apparatus of claim 1, wherein the drive arrangement is adapted to be manually driven.

4. The apparatus of claim 1, wherein the drive arrangement is adapted to be powered.

5. The apparatus of claim 4, wherein the drive arrangement is adapted to engage a power input coupling.

6. The apparatus of claim 1, wherein the drive arrangement includes an operator handle adapted for rotation by an operator.

7. The apparatus of claim 6, wherein the operator handle includes a crank handle.

8. The apparatus of claim 1, wherein the drive arrangement includes a drive shaft.

9. The apparatus of claim 8, wherein the drive shaft is coaxial with the reamer shaft.

10. The apparatus of claim 1, wherein the gear arrangement includes a spur gear arrangement, in which a gear wheel mounted to a drive shaft mates with at least one pinion.

11. The apparatus of claim 10, wherein the pinion is a double gear and mates with a gear wheel coupled to the reamer shaft.

12. The apparatus of claim 1, wherein the cutter advance arrangement is adapted to advance the reamer shaft axially of the housing with rotation of the reamer shaft.

13. The apparatus of claim 12, wherein the cutter advance arrangement includes a threaded portion for engaging a corresponding threaded portion on the housing.

14. The apparatus of claim 13, wherein the cutter advance arrangement includes an external thread and the housing defines an internal thread.

15. The apparatus of claim 12, wherein the gear arrangement includes a pinion engaging a ring gear on a threaded portion of the cutter advance arrangement.

16. The apparatus of claim 12, wherein a linked gear arrangement is provided between the drive arrangement and both the reamer shaft and the cutter advance arrangement.

17. The apparatus of claim 12, wherein the gear arrangement includes a gear mounting providing mounting for a pinion, which gear mounting may be selectively configured to be locked against rotation relative to the housing such that rotation of the pinion results in rotation of a ring gear mating with the pinion relative to the housing.

18. The apparatus of claim 1, further comprising:
a clamping arrangement adapted to locate the housing relative to the tubing to be reamed, the clamping arrangement being adapted to reduce at least one of residual bend and ovality of the tubing.

19. The apparatus of claim 18, wherein the clamping arrangement is adapted to reduce both residual bend and ovality of the tubing.

20. The apparatus of claim 18, wherein the clamping arrangement comprises at least two parts defining contact surfaces for collectively defining a cylindrical form corresponding to a desired tubing form.

21. The apparatus of claim 20, wherein the cylindrical form is substantially continuous.

22. The apparatus of claim 20, wherein the clamping arrangement comprises two parts each defining a semi-cylindrical form.

23. The apparatus of claim 20, wherein the parts are adapted to be configured in a loading configuration and in a clamping configuration.

24. The apparatus of claim 23, wherein the clamping arrangement further comprises retainers operable to retain the parts in the clamping configuration.

25. The apparatus of claim 24, wherein the retainers are operable to apply force to the parts to deform the tubing.

26. The apparatus of claim 25, wherein the retainers comprise threaded members extending between the parts.

27. The apparatus of claim 20, wherein the cylindrical form defined by the parts has an axial extent greater than the diameter of the form.

28. The apparatus of claim 27, wherein the cylindrical form has an axial extent at least two times the diameter of the form.

29. The apparatus of claim 18, wherein the clamping arrangement is separable from the housing.

30. The apparatus of claim 18, wherein the clamping arrangement includes at least one housing engaging member.

31. A method of reaming tubing, the method comprising:
mounting a housing to tubing to be reamed, a cutter being mounted on a reamer shaft mounted to the housing;
engaging the tubing with the cutter;
applying an input force to drive the reamer shaft and rotate the cutter via gearing which modifies the nature of the input force on transfer to the reamer; and
advancing the cutter with rotation of the reamer shaft.

32. The method of claim 31, comprising applying an input torque at an input speed to the gearing and thereby applying an increased torque at a reduced speed to the reamer shaft.

33. The method of claim 31, comprising applying a manually applied input torque to the gearing.

34. The method of claim 31, comprising applying a powered input to the gearing.

35. The method of claim 31, comprising varying the relationship between the rate of advance of the cutter and the rate of rotation of the cutter.

36. The method of claim 31, further comprising locating a clamping arrangement on the tubing, the clamping arrangement defining a desired tubing form, and actuating the clamping arrangement to deform the tubing to said desired tubing form.

37. The method of claim 36, comprising reducing at least one of residual bend and ovality of the tubing.

38. The method of claim 37, comprising reducing both residual bend and ovality of the tubing.

39. The method of claim 36, further comprising mounting the housing relative to the tubing via the clamping arrangement.

40. The method of claim 36, comprising clamping the tubing between at least two parts defining contact surfaces collectively defining a cylindrical form.

41. The method of claim 31, wherein the tubing is coiled tubing.

* * * * *

UNITED STATES PATENT AND TRADEMARK OFFICE
CERTIFICATE OF CORRECTION

PATENT NO. : 7,478,548 B2  Page 1 of 1
APPLICATION NO. : 11/273892
DATED : January 20, 2009
INVENTOR(S) : Fogg It is certified that error appears in the above-identified patent and that said Letters Patent is hereby corrected as shown below:

Title Page;
In the References Cited (56):

Please delete "WO 01/19361 A2 4/2001" and insert --WO 01/29361 A2 4/2001-- therefor;

In the Claims:

Column 10, Claim 31, Line 18, please insert --shaft-- after reamer.

Signed and Sealed this

Twenty-first Day of April, 2009

JOHN DOLL
*Acting Director of the United States Patent and Trademark Office*